United States Patent
Yoon et al.

(10) Patent No.: US 8,125,317 B2
(45) Date of Patent: Feb. 28, 2012

(54) PORTABLE DEVICE FOR CACHING RFID TAG AND METHOD THEREOF

(75) Inventors: Hyung-min Yoon, Seoul (KR);
Kyung-ho Park, Suwon-si (KR);
Woo-shik Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1293 days.

(21) Appl. No.: 11/374,186

(22) Filed: Mar. 14, 2006

(65) Prior Publication Data

US 2006/0202803 A1     Sep. 14, 2006

(30) Foreign Application Priority Data

Mar. 14, 2005  (KR) .................. 10-2005-0021047
Feb. 6, 2006   (KR) .................. 10-2006-0011156

(51) Int. Cl.
*H04Q 5/22* (2006.01)
(52) U.S. Cl. ........................... 340/10.4; 340/5.1
(58) Field of Classification Search ............... 340/10.4, 340/539.11, 539.13, 5.1, 10.2, 10.3, 10.5
See application file for complete search history.

(56) References Cited

U.S. PATENT DOCUMENTS

| | | | | |
|---|---|---|---|---|
| 5,463,376 A | * | 10/1995 | Stoffer | 340/572.4 |
| 6,141,507 A | * | 10/2000 | Sawada | 399/8 |
| 6,286,762 B1 | * | 9/2001 | Reynolds et al. | 235/472.01 |
| 6,853,294 B1 | * | 2/2005 | Ramamurthy et al. | 340/10.1 |
| 7,030,761 B2 | * | 4/2006 | Bridgelall et al. | 340/572.2 |
| 7,124,943 B2 | * | 10/2006 | Quan et al. | 235/451 |
| 7,245,221 B2 | * | 7/2007 | Claudatos et al. | 340/572.1 |
| 2004/0268066 A1 | | 12/2004 | Kelly et al. | |
| 2005/0035862 A1 | | 2/2005 | Wildman et al. | |

FOREIGN PATENT DOCUMENTS

| | | | |
|---|---|---|---|
| EP | 1288878 | * | 5/2003 |
| JP | 3-16750 A | | 1/1991 |
| JP | 4-311290 A | | 11/1992 |
| JP | 9-224270 A | | 8/1997 |
| JP | 10-275208 A | | 10/1998 |
| JP | 2001-240217 A | | 9/2001 |
| JP | 2001-273226 A | | 10/2001 |
| JP | 2003-76953 A | | 3/2003 |
| JP | 2003-256669 A | | 9/2003 |
| JP | 2004-005251 A | | 1/2004 |
| JP | 2004-351915 A | | 12/2004 |
| JP | 2004-362439 A | | 12/2004 |
| WO | WO 99/15015 A1 | | 4/1999 |

OTHER PUBLICATIONS

Extended European Search Report Dated Oct. 26, 2009.
Communication issued on Jul. 13, 2010 by the Japanese Patent Office in corresponding Japanese Patent Application No. 2008-501806.

* cited by examiner

*Primary Examiner* — Vernal Brown
(74) *Attorney, Agent, or Firm* — Sughrue Mion, PLLC

(57) ABSTRACT

A portable device includes an RFID reader for detecting a tag information of an RFID tag, a memory for storing the tag information detected by the RFID reader, and a controller. When a read command for the RFID tag is input and the tag information is valid, the controller controls the RFID reader to retrieve the tag information of the memory. If the tag information is invalid, the controller controls the RFID reader to re-read the RFID tag. The controller can determine whether the tag information is valid using the time and location. Because unnecessary operation can be omitted to read tags, power consumption is reduced and tag information check time is shortened.

33 Claims, 6 Drawing Sheets

PORTABLE DEVICE FOR CACHING RFID TAG AND METHOD THEREOF

CROSS-REFERENCE TO RELATED APPLICATION

This application claims priority from Korean Patent Application Nos. 2005-21047 and 2006-11156, filed Mar. 14, 2005 and Feb. 6, 2006, respectively, in the Korean Intellectual Property Office, the entire contents of which are incorporated herein by reference.

BACKGROUND OF THE INVENTION

1. Field of the Invention

The present invention relates to a portable device for caching radio frequency identification (RFID) tag data, and a method thereof. More particularly, the present invention relates to a portable device and a method thereof, which stores read tag data so that if a read command is re-entered within a predetermined time and the stored tag data is still valid, the portable device uses the stored tag data.

2. Description of the Prior Art

With the advancement of wireless technology, a variety of RFIDs are currently available from a simple prepaid bus card and entrance ticket to parking lot to rather complicated access card to the places of high security such as laboratory. An RFID system has been developed to satisfy the people's growing demands for more efficient production method, more consumer satisfactory products, more advanced technologies and effective replacements for barcodes and magnetic cards. An RFID system basically includes an RFID tag and an RFID reader. The RFID tag is a contactless card. The user does not need to insert the tag in the reader. Since the physical contact is omitted, problems such as friction or damage are avoided, and the tag is subjected to less influence by the surrounding factors.

An RFID system can be divided into an active type and a passive type depending on how an integrated circuit (IC) implemented in the tag is driven. The active type system supplies power to the internal battery of the tag, while the passive type system induces electric current using electromagnetic waves received from the RFID reader. Additionally, RFID system can be divided into high frequency system and low frequency system according to the frequency band it uses. The low frequency system uses the frequency of approximately several tens of MHz. Accordingly, the system has relatively short reading distance ranging from 10 cm to 15 cm. The high frequency system uses frequency signal approximately of 900 MHz, and thus has longer reading distance of 1 m to 4 m.

The RFID reader function has recently been incorporated into the portable devices such as mobile phones, personal data assistants (PDAs), and laptop computers to maximize utilization thereof. Accordingly, it is now possible to check data of RFID tags in certain distances using mobile phones. Taking a department store for instance, RFID tags can be attached to the products with storing information about the products, such as price, manufacturer, etc., and the customers can check the information of the products from the RFID tags using their mobile phones. In order to use RFID system in the above way, reading distance of at least several meters needs be secured, and a high frequency system is quite efficient in this regard.

Meanwhile, the existing portable devices with RFID reading function re-reads RFID tag when a read command is re-entered during the execution of the application program. Accordingly, an RFID reader chip of the portable device is driven to transmit electromagnetic waves. The RFID tags within a predetermined distance from the portable device generate induction current when receiving the electromagnetic waves. The IC of the RFID tag is driven by the generated induction current, to transmit predetermined tag information. Portable devices usually change locations gradually. Accordingly, it is quite possible that the same RFID tag is read when a read command is entered within a predetermined time. This means that reading process can be unnecessary, especially when a read command is re-entered within the predetermined time. But the tag reading process is always performed regardless of whether the tag information of the RFID tag has previously been read, to extend the time for checking the tag information.

In the case of a high frequency RFID system in particular, the power consumption is high in transmitting and receiving the electromagnetic waves. This can be a very serious problem in a portable device which has a limited battery capacity.

SUMMARY OF THE INVENTION

The present invention provides a portable device and a method thereof, which is capable of preventing unnecessarily repeated reading of an RFID tag by caching the previously-read RFID tag information and thus reducing the time for providing tag information and power consumption.

According to an aspect of the present invention, there is provided a portable device comprising an RFID reader for detecting a tag information of an RFID tag, a memory for storing the tag information detected by the RFID reader, and a controller, when a read command for the RFID tag is input and when the tag information is valid, retrieving the tag information of the memory.

The portable device may further comprise an input unit for inputting the read command for the RFID tag.

If the read command for the RFID tag is input and the tag information is invalid, the controller may control the RFID reader to re-detect the tag information of the RFID tag.

If the re-detected tag information is same as the previously stored tag information of the memory, the controller may discard the re-detected tag information, and when the re-detected tag information is not same as the previously stored tag information of the memory, the controller may store the re-detected tag information to the memory.

If the tag information is determined to be valid, the controller may determine the validation degree of the tag information and provides the tag information together with the determined validation degree.

The portable device may further comprises a display for indicating the tag information together with a message corresponding to the determined validation degree.

If a predetermined validation time has not been elapsed from the point of detecting the tag information, the controller may determine the tag information to be valid.

The portable device may further comprise a timer for counting the time from the point when the RFID reader detects the tag information. If the counted time exceeds the predetermined validation time, the controller may control the RFID reader to re-detect the tag information of the RFID tag according to the read command, and if the counted time does not exceed the predetermined validation time, the controller may detect the previously stored tag information of the memory according to the read command.

If the counted time does not exceed the predetermined validation time, the controller may determine the validation degree using the difference between the counted time and the predetermined validation time.

When the current position is within a predetermined validation distance from the point where the tag information is detected, the controller may determine the tag information to be valid.

The portable device may further comprise a distance measuring part for measuring a moving distance from the point of detecting the tag information to the point of inputting the read command. If the moving distance exceeds the predetermined validation distance, the controller may control the RFID reader to re-detect the tag information of the RFID tag according to the read command, and if the moving distance does not exceed the predetermined validation distance, the controller may detect the previously stored tag information of the memory according to the read command.

If the moving distance does not exceed the validation distance, the controller may determine the validation degree using the difference between the moving distance and the validation distance.

The portable device may further comprise a communication part for performing wireless communication with a server corresponding to the tag information, and receiving a predetermined information, and a display for displaying the data received from the communication part according to the control of the controller.

The memory may store information about the time and location of detecting the tag information, together with the tag information.

The memory may delete the stored tag information when a predetermined time elapses since the storage of the tag information.

If the read command is input, the RFID reader may detect tag information of all the RFID tags within a predetermined reading distance for a predetermined time.

If the read command is input through the input during the execution of a predetermined application program, the controller may control the RFID reader to selectively detect only the tag information of the RFID tag which corresponds to the application program.

According to another aspect of the present invention, there is provided a portable device comprising an RFID reader for detecting a tag information of an RFID tag, a memory for storing the tag information detected by the RFID reader and additional information related with the RFID tag reading, and a controller for selecting invalid tag information from the memory according to the additional information and deleting the selected information.

The additional information comprises at least one of a time of detecting the tag information, a location of detecting the tag information, a validation time and a validation distance.

The controller may determine the tag information to be invalid based on the additional information if at least one of an elapsed time from the time of detecting the tag information exceeds the validation time; and a moving distance from the location of detecting the tag information to current location exceeds the validation distance.

According to one aspect of the present invention, an RFID tag reading method of a portable device comprises if a read command is input, determining whether a previously detected and stored tag information is valid; and if the tag information is determined to be valid, providing the stored tag information.

If the tag information is determined to be invalid, the RFID tag is read and the tag information of the RFID tag is detected and provided.

If the detected tag information is same as the previously stored tag information, the re-detected tag information is discarded, and if the detected tag information is not same as the previously stored tag information, the detected tag information is stored.

The tag information is determined to valid, using elapsed time from the time of detecting the tag information.

The determining whether the previously detected and stored tag information is valid comprises: counting an elapsed time from the detecting the tag information; comparing the counted time and a predetermined validation time; and when the counted time does not exceed the validation time, determining the tag information to be valid, and when the counted time exceeds the validation time, determining the tag information to be invalid.

If the tag information is determined to be valid, the validation degree of the tag information is determined using a difference between the counted time and the validation time.

Whether the tag information is valid is determined using a distance from the location of detecting the tag information to current location.

The determining whether the previously detected and stored tag information is valid comprises measuring a moving distance from the location of detecting the tag information to the location of inputting the read command; and if the moving distance does not exceed a predetermined validation distance, determining the tag information to be valid, and if the moving distance exceeds the validation distance, determining the tag information to be invalid.

If the tag information is determined to be valid, a validation degree of the tag information is determined using the difference between the moving distance and the validation distance.

The method may further include wirelessly communicating with a server corresponding to the tag information, and receiving data; and displaying the received data.

The method may further included additionally storing information about time and location of detecting the tag information.

When a predetermined time elapses since the storage of the tag information, the stored tag information may be deleted.

The all the RFID tags within a predetermined reading distance may be detected.

When the read command is input during the execution of a predetermined application program, only the tag information of the RFID tag which corresponds to the application program is selectively detected.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Hereinafter, the present invention will be described in detail with reference to the drawings.

Figure 1:
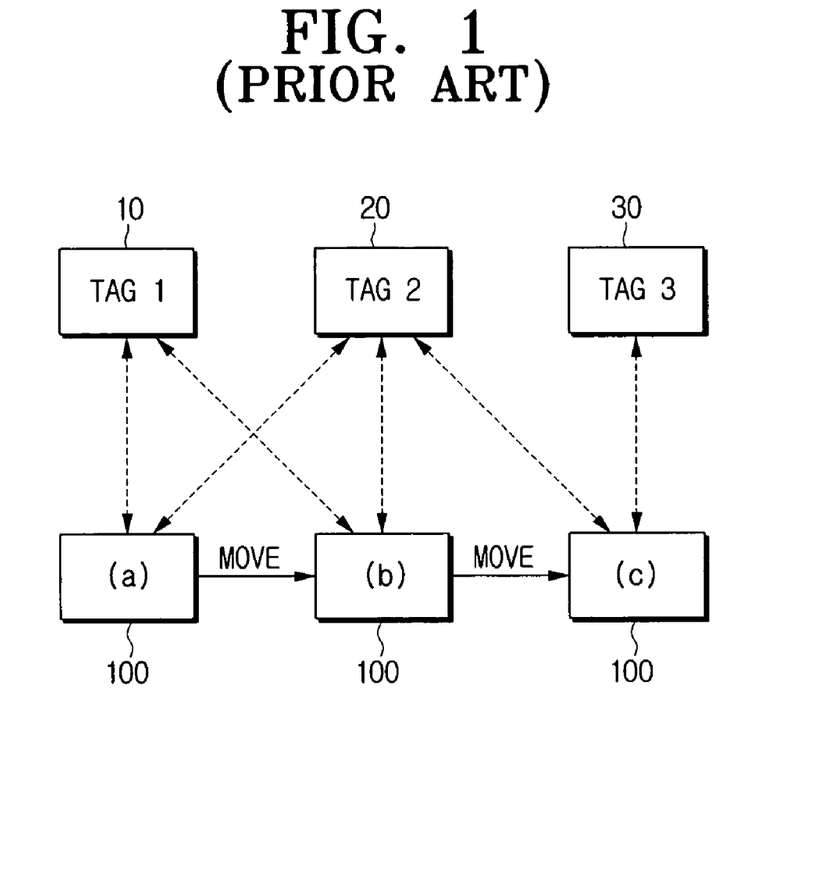
FIG. 1 is a view to explain RFID reading according to a movement of a portable device in an environment where there are a plurality of RFID tags.

FIG. 1 is a view to explain RFID reading according to a movement of a portable device in an environment where there are a plurality of RFID tags.

Referring to FIG. 1, an RFID system includes a plurality of RFID tags 10, 20, 30 and a portable device 100. The RFID tags 10, 20, 30 may be attached, for example, to movie posters, products or food products.

The portable device 100 includes an RFID reading chip (not shown) to read RFID tags. Accordingly, the portable device 100 can check tag information if the RFID tags are within a predetermined reading distance. When a user of the portable device 100 enters a read command at the location (a) which is in the predetermined reading distance to the first and the second tags 10, 20, the portable device 100 transmits the electromagnetic waves and reads in information of the first and second tags 10, 20. The read tag information is provided to the application program which is currently used by the portable device 100. The read tag information is stored to the internal memory of the portable device 100.

When the portable device 100 moves in the direction indicated by the arrow with solid line and stops at the location (b), the first and second tags 10, 20 are still within the reading distance of the portable device 100. In this case, electromagnetic waves need not be transmitted in response to the read command which is re-entered. The previously stored tag information can be read out and provided to the application program.

When the portable device 100 keeps moving and stops at the location (c), the second and third tags 20, 30 are within the reading distance of the portable device 100. Accordingly, when a read command is entered, the portable device 100 transmits electromagnetic waves around, detects new tag information, and provides the detected tag information to the application program.

A predetermined validation time may be set in consideration of the speed of the portable device 100. If a read command is entered within the validation time, it is determined that the tags within the reading distance have not changed, and thus the previously read information can be used. If a read command is entered after the validation time, there is the possibility of having new tags within the reading distance, and therefore, it is preferable to read for new RFID tags.

The user of the portable device 100 may stop near the RFID tag, or keep walking about the RFID tag. Thus, it is preferable to set a predetermined validation distance to use when determining whether to detect the tag information. More specifically, the predetermined validation distance can be set and compared with the distance between the portable device 100 and the location where the RFID tag has previously been read.

If the portable device 100 has moved within the predetermined distance from the location where the RFID tag has previously been read, the stored tag information can be used. If the portable device 100 has moved out of the validation distance, tag information can be newly detected and used. In order to enable the portable device 100 to use the validation distance, the portable device 100 may be provided with a location determining device such as a Global Positioning System (GPS).

Figure 2:
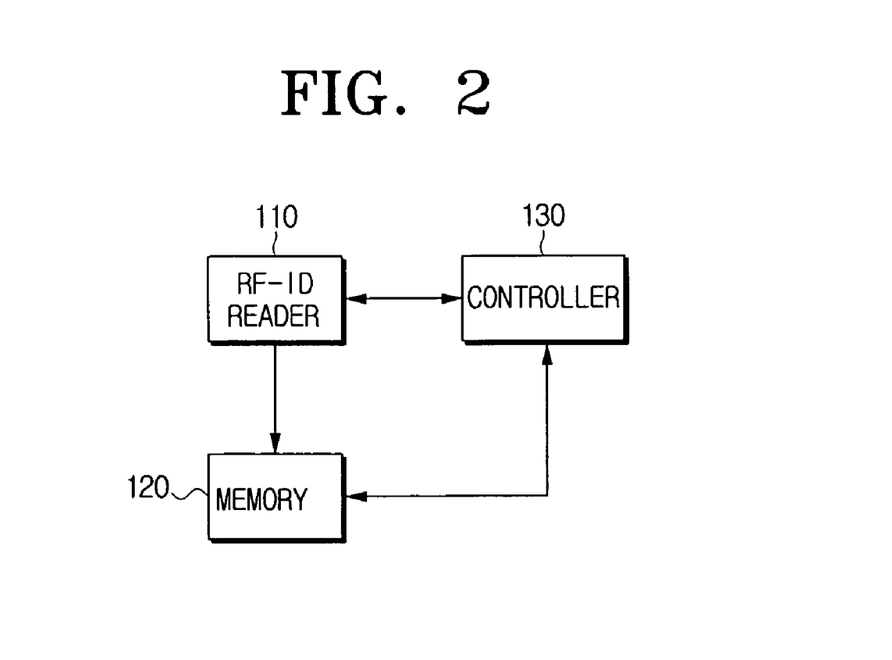
FIG. 2 is a block diagram of a portable device according to an exemplary embodiment of the present invention.

FIG. 2 is a block diagram of the portable device 100 according to an exemplary embodiment of the present invention. Referring to FIG. 2, the portable device 100 includes an RFID reader 110, a memory 120 and a controller 130.

The RFID reader 110 reads tag information of the RFID tags within a predetermined reading distance.

The controller 130 stores the tag information read by the RFID reader 110, and manages the stored information.

In addition to the tag information, the memory 120 may store information such as the time of reading the RFID tag, location, and validation time and distance.

The controller 130 checks the additional information of the memory 120, determines whether the tag information is valid, and manages the tag information according to the determination result. More specifically, if the tag information is determined to be valid, the controller 130 maintains the tag information, otherwise, the controller 130 deletes the tag information. When the tag information read by the RFID reader 110 is redundant in consideration of the previously stored tag information of the memory 120, the controller 130 discards the tag information without changing the stored tag information. Whether the tag information is valid can be determined based on the time or distance. If the tag information is valid, the controller 130 may additionally check the validation degree of the tag information and provide the checked information together with the tag information. The validation degree of the tag information can be determined based on the comparison between time or location of detecting the tag information on one hand, and time or location of inputting tag read command on the other hand. The method of determining the validation degree of the tag information will be explained below in greater detail.

Figure 3:
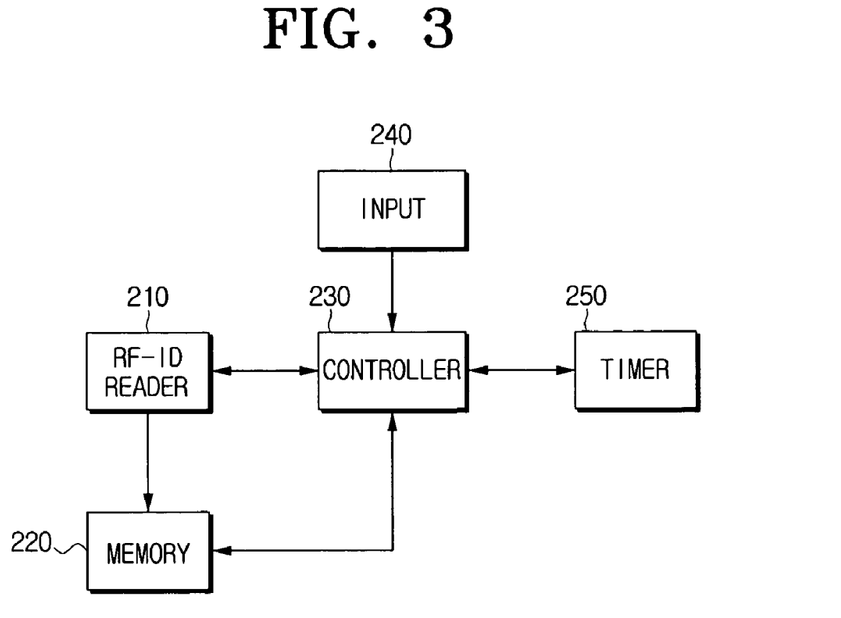
FIGS. 3 to 5 are block diagrams of a portable device according to second, third and fourth exemplary embodiments of the present invention.

FIG. 3 is a block diagram of the structure of a portable device according to an exemplary embodiment of the present invention which determines whether the tag information is valid based on the time. The portable device of FIG. 3 includes an RFID reader 210, a memory 220, a controller 230, and input 240 and a timer 250.

The input 240 operates to input a read command. That is, in the process of executing a predetermined application program on the portable device, a user may select a read menu to order reading of the tags or manipulates buttons on the body of the portable device to input a read command.

The RFID reader 210 reads tag information of the RFID tag in a predetermined reading distance, in response to the read command. To this end, the RFID reader 210 may include an antenna (not shown) and a demodulation circuit. Accordingly, as the read command is input, the RFID reader 210 may output electromagnetic waves through the antenna and receives electromagnetic waves from the RFID tag. The demodulation circuit demodulates the received electromagnetic waves and accordingly detects the tag information.

Mobile communications companies, distributors, or manufacturers may provide application programs. In one example, a company may provide an application program and the portable device may be designed to read RFID tags of the company when a read command is input through the company's application program. In this case, the identifier of the received tag is checked and certain tag information can be selectively detected.

The controller 230 stores to the memory 220 the tag information read by the RFID reader 210. The controller 230 may directly display the tag information on the screen, or provide to a predetermined application program. The controller 230 may control the timer 250 such that the controller 230 can detect information about the time of reading the tag information and store to the memory 220 the detected information together with the tag information.

The cache memory may be implemented as the memory 220. The cache memory is a specialized memory of high speed which is designed to efficiently handle transmission of frequently used commands or data in a computer processor. The memory 220 may delete tag information according to the control of the controller 230 when a predetermined time elapses since the storages of the tag information.

The timer 250 counts the time from when the tag is read. When a read command is re-entered through the input 240, the controller 230 determines whether the counted time of the counter 250 exceeds a predetermined validation time. If the counted time does not exceed the validation time, the controller 230 determines that the tag information is valid. Accordingly, the controller 230 retrieves the tag information from the memory 220 to use.

If the time counted by the counter 250 exceeds the predetermined validation time, the controller 230 determines that the tag information is not valid. Accordingly, the controller 230 controls the RFID reader 210 to re-read RFID tags and re-detects tag information.

If the tag information is valid, the controller 230 checks validation degree of the tag information. More specifically, the validation degree of the tag information is determined by using the difference between the counted time and the validation time. For example, if the validation time is 5 seconds, the information with 1 second of counted time is determined to be quite valid, and the tag information with 5 seconds of counted time is determined to be relatively less valid. The controller 230 may divide the degree of validation into predetermined sections and provide the determined validation degree together with the tag information. For example, the tag information with a difference of 5 to 3 seconds from validation time can be considered as 'good', the tag information with a difference of 3 to 2 seconds can be determined as 'OK', and the tag information with a difference of 2 to 0 seconds can be determined as 'not good'. The information can be provided in the form of text message or graphic image.

Figure 4:
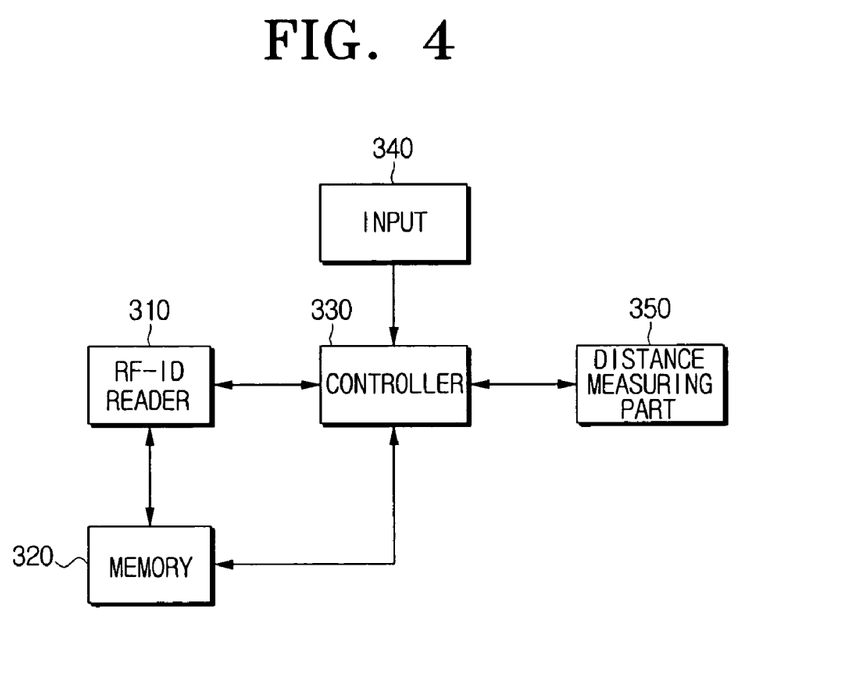

FIG. 4 is a block diagram showing the structure of a portable device according to an exemplary embodiment of the present invention, which determines whether the tag information is valid based on distance. Referring to FIG. 4, the portable device includes an RFID reader 310, a memory 320, a controller 330, an input 340 and a distance measuring part 350.

The distance measuring part 350 operates to measure moving distance from the point of reading tag information, using the location information. More specifically, the distance measuring part 350 may receive location information from a GPS satellite using a device such as GPS location determining device and compare it to measure the moving distance.

When RFID tag is read according to the read command, the controller 330 stores the information about the point of reading to the memory 320. Then as a read command is re-entered, the controller 330 checks whether a moving distance between the previous point and the current point is below a validation distance, to determine whether the tag information is valid. That is, if the moving distance has exceeded the validation distance, the controller 330 determines the tag information to be invalid, and thus performs a new reading operation. If the moving distance is within the validation distance, the controller 330 determines the tag information to be valid, and uses the stored tag information.

The validation degree of the tag information can be additionally checked and provided. Taking the validation distance of 5 m for example, a moving distance of 1 m will have difference from the validation distance by 4 m, and a moving distance of 4.5 m will have difference from the validation distance by 0.5 m. The controller 330 may divide the difference from the validation distance into several stages, and provide the tag information together with the validation information. For example, the tag information with the moving distance 5 to 3 m different from the validation distance may be indicated as 'good', the tag information with the moving distance 3 to 2 m different from the validation distance may be indicated as 'OK', and the tag information with the moving distance 2 to 0 m different from the validation distance may be indicated as 'not good'. The information may be provided in the form of text message or graphic image.

Because the operations of the other elements excluding the distance measuring part 350 and the controller 330 are similar to those explained in the above exemplary embodiment with reference to FIG. 3, explanations thereof will be omitted for the sake of brevity.

Figure 5:
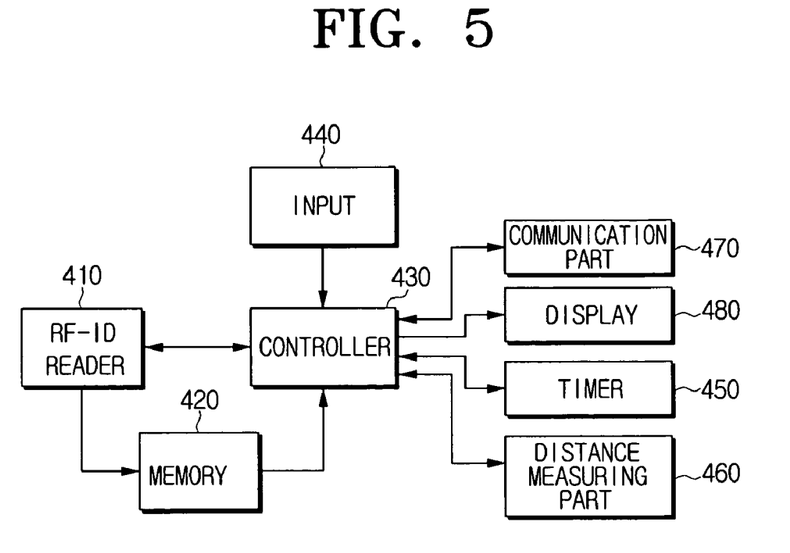

FIG. 5 is a block diagram showing the structure of a portable device according to another exemplary embodiment of the present invention.

Referring to FIG. 5, the portable device includes an RFID reader 410, a memory 420, a controller 430, an input 440, a timer 450, a distance measuring part 460, a communication part 470 and a display 480.

The operations of the RFID reader 410, the memory 420, the controller 430, the input 440, the timer 450 and the distance measuring part 460 are similar to those explained in the above exemplary embodiments with reference to FIGS. 3 and 4. Therefore, explanations thereof will be omitted for the sake of brevity.

The communication part 470 operates to perform communication with a server. More specifically, the communication part 470 may perform communications under Bluetooth, WLAN and UWB specifications. When the tag information is detected from the RFID tag, data request packet is transmitted to the server corresponding to the tag information. The server transmits data corresponding to the tag information to the communication part 470, in response to the data request packet. The server may include a web server run by the tag manufacturers. Accordingly, the data from the server may include information such as price, manufacturer, and expiry date of the product and cautions in handling the product.

The display 480 shows the data from the communication part 470 according to the control of the controller 430. When the tag information is detected during the execution of the application program, the controller 430 receives data corresponding to the tag information from the server and displays an application window which contains the corresponding data. Because the RFID tags are provided in small sizes and in high quantity, there is a problem that the RFID tags cannot store a large volume of data. Therefore, it is preferable to store the minimum tag information in the RFID tag, and receive the other data from separate servers and indicate through the screen.

The display 480 may provide text message or graphic image together with tag information, to indicate the validation degree as determined by the controller 430. As the method of determining validation degree of the tag information has already been described above, the explanation thereof will be omitted for the sake of brevity.

In the exemplary embodiments described above, the RFID reader 110, 210, 310, 410, the memory 120, 220, 320, 420, and the controller 130, 230, 330, 430 are imbedded in one portable device. In this case, the portable device 100 may be implemented as an RFID reader chip.

The portable device 100 may also be implemented as the portable communication devices such as mobile phones, and in this case, the RFID reader 110, 210, 310, 410 is implemented as a separate reader chip, while the controller 130, 230, 330, 430 is implemented as an internal microprocessor of the portable device. Accordingly, the reader chip can be connected to the portable device.

According to one aspect of the present invention, the memory 120, 220, 320, 420 may be provided in the reader chip, or in the portable device.

Figure 6:
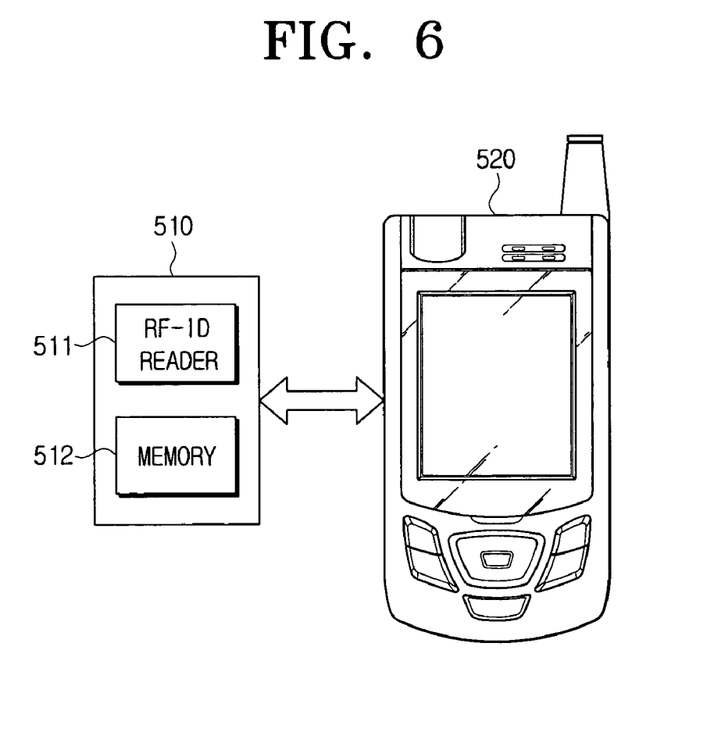
FIG. 6 is a view to explain the case where the RFID reader is implemented as a separate reader chip.

FIG. 6 shows an exemplary embodiment of the present invention where the portable device is connected with an external reader chip. Referring to FIG. 6, an external reader chip 510 includes an RFID reader 511 and a memory 512, and is connectible to the portable device 520. The reader chip 510 and the portable device 520 may be connected through USB interface, or parallel interface.

With being connected with the reader chip 510, the portable device 520 receives a read command through various input means as provided. Accordingly, the portable device 520 detects tag information of the RFID tags within a predetermined reading distance. The detected tag information can be displayed through a variety of displays as provided with the portable device 520.

Like the above exemplary embodiments of the present invention, the portable device 520 can use the stored tag information if the memory 512 of the reader chip 50 is determined to store valid tag information.

Figure 7:
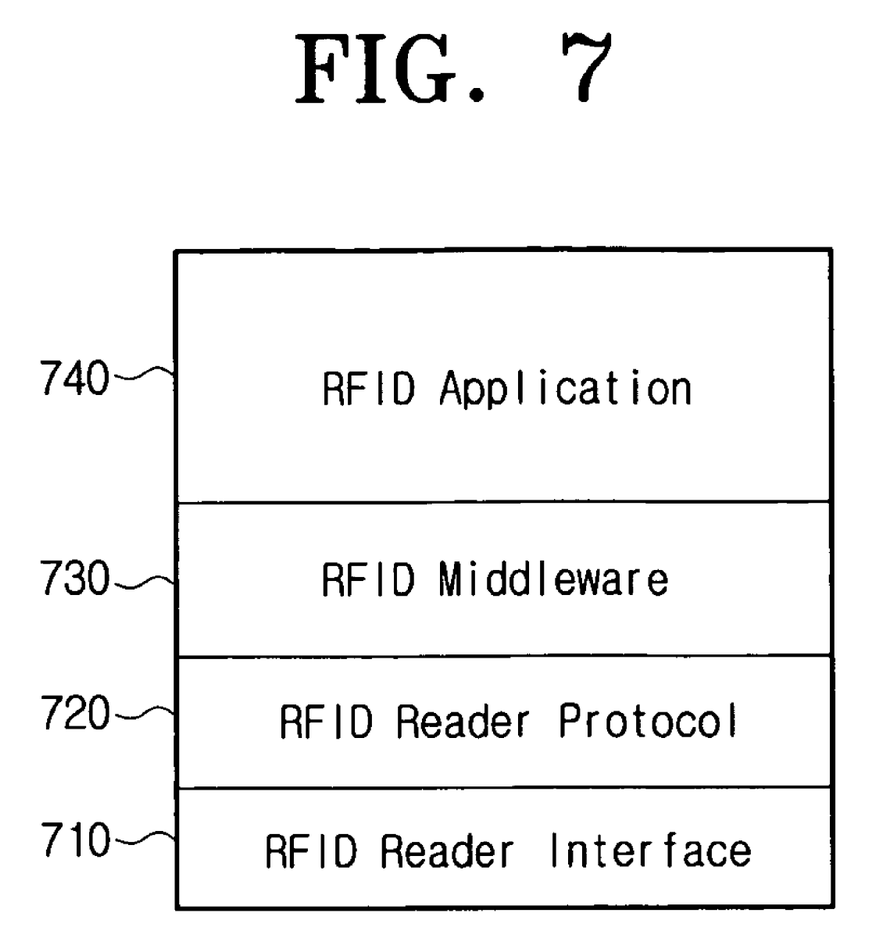
FIG. 7 is a view to explain one example of a software structure of a control part of the portable device of FIG. 2.

FIG. 7 shows the software structure of the controller 130, 230, 330, 430 according to the exemplary embodiments of the present invention. Referring to FIG. 7, the software structure of the controller 130, 230, 330, 430 includes a RFID reader interface 710, a RFID reader protocol 720, a RFID middleware 730 and a RFID application 740.

The RFID reader interface 710 operates to receive tag information as detected by the RFID reader 110, 210, 310, 410. The RFID reader protocol 720 operates to control the memory 120, 220, 320, 420 to write and read the tag information, and filter the information. The validation time and distance may be recorded in the memory 120, 220, 320, 420 by the RFID reader protocol 720.

The RFID middleware 730 provides the function of managing the tag information as detected by the RFID reader 110, 210, 310, 410. More specifically, when a read command is input through the RFID application 740, tag information corresponding to the RFID application 740 is detected, and the data corresponding to the tag information is received from the server using the communication part 470, to be provided to the RFID application 740 together with the tag information. The RFID application 740 performs a variety of functions using the tag information transmitted through the RFID middleware 730.

Figure 8:
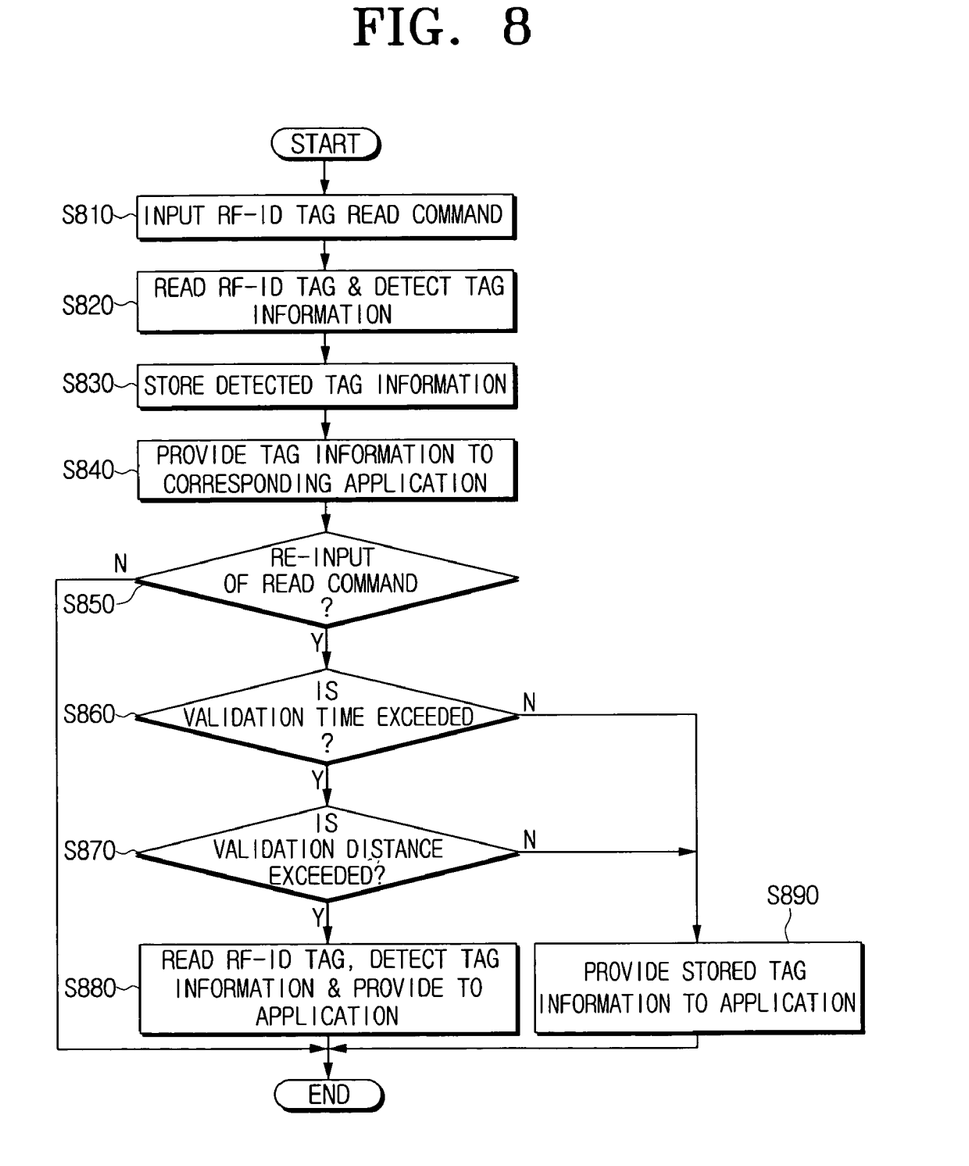
FIG. 8 is a flowchart to explain a method of reading RFID tag of a portable device according to an exemplary embodiment of the present invention.

FIG. 8 is a flowchart to explain an RFID tag reading of a portable device according to an exemplary embodiment of the present invention.

Referring to FIG. 8, when a read command for RFID tag is input (S810), the portable device reads RFID tags within a predetermined reading distance to it and thus detects the tag information (S820). Next, the detected tag information is stored (S830), and provided to the corresponding application program (S840).

When a read command is re-entered (S850), the validity of the tag information is determined. This can be determined based on the time or distance.

More specifically, first, it is determined whether the elapsed time from the previous detecting of the tag information till the current time exceeds a predetermined validation time (S850). If the elapsed time does not exceed the predetermined validation time, the stored tag information is determined to be valid, and the tag information is provided to the application program (S890).

If the elapsed time exceeds the predetermined validation time, it is determined whether the moving distance from the previous location detecting of the tag information to the current location exceeds the validation distance (S870). If the moving distance does not exceed the validation distance, the stored tag information is provided to the application program (S890), and if the moving distance exceeds the validation distance, the RFID tags are read, tag information is detected, and the newly detected tag information is provided to the application program (S880).

Figure 9:
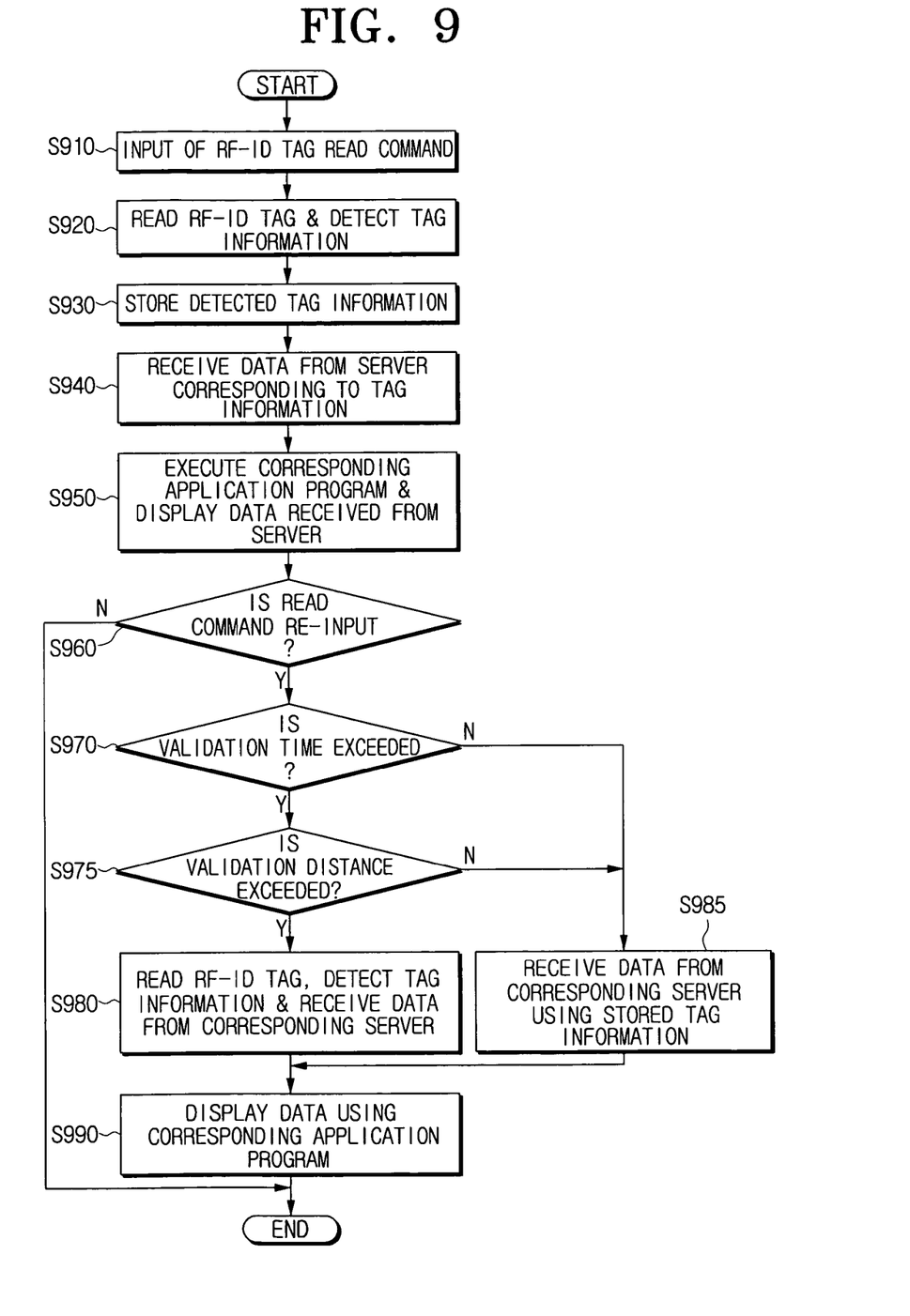
FIG. 9 is a flowchart to explain a method of reading RFID tag of a portable device according to an exemplary embodiment of the present invention.

FIG. 9 is a flowchart to explain an RFID tag reading method of a portable device according to another exemplary embodiment of the present invention.

Referring to FIG. 9, an RFID tag read command is input (S910), tag information is detected (S920), and the detected information is stored (S930).

Next, data corresponding to the detected tag information is received from a predetermined server (S940). Accordingly, a predetermined application program is executed, and the received data is displayed (S950).

Later, when a read command is re-entered (S960), whether the validation time is exceeded is determined (S970) and whether the validation distance is exceeded is determined (S975), and according to the determination result, the RFID tags may be re-read (S980) or the previously stored tag information can be retrieved (S985). The processes after the input of a read command are same as those explained above with reference to FIG. 8. Therefore, detailed explanation will be omitted for the sake of brevity.

Accordingly, data corresponding to the tag information is displayed using a predetermined application program (S990).

The exemplary embodiments as described above with reference to FIGS. 8 and 9 determines validity of tag information considering not only the validation time, but also the validation distance. However, this should not be construed as limiting. Rather, whether to re-read tag information may be determined using one of the validation time and validation distance, as far as it suits the characteristics of the portable device.

As described above in a few exemplary embodiments of the present invention, when a read command for tag information is input, it is determined, using at least one of the validation time and distance, whether to re-read tag information or use the previously stored tag information. As a result, unnecessary power consumption can be reduced. Additionally, because time for re-reading can be reduced, tag information can be provided to the application program rapidly.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A portable device comprising:
   a radio frequency identification (RFID) reader which detects tag information of an RFID tag;
   a memory which stores the tag information detected by the RFID reader; and
   a controller which retrieves the tag information stored in the memory and determines a validation degree of the tag information to provide the validation degree if a read command for the RFID tag is input and the tag information is valid, wherein the tag information is determined to be valid when the read command is input within a predetermined validation time or the RFID tag is determined to be within a predetermined validation distance, wherein the controller detects the tag information according to the read command by comparing a moving distance of the portable device with the predetermined validation distance, the moving distance being measured from a point of detecting the tag information to a point of inputting the read command.

2. The portable device of claim 1, further comprising an input unit through which the read command for the RFID tag is input.

3. The portable device of claim 2, wherein, if the read command for the RFID tag is input and the tag information is invalid, the controller controls the RFID reader to re-detect the tag information of the RFID tag.

4. The portable device of claim 3, wherein, if the re-detected tag information is same as the previously stored tag information of the memory, the controller discards the re-detected tag information, and if the re-detected tag information is not same as the previously stored tag information of the memory, the controller stores the re-detected tag information to the memory.

5. The portable device of claim 4, wherein, if the tag information is determined to be valid, the controller determines a validation degree of the tag information and provides the tag information together with the validation degree.

6. The portable device of claim 5, further comprising a display which displays the tag information together with a message corresponding to the validation degree.

7. The portable device of claim 5, wherein, if a predetermined validation time has not been elapsed from a point of detecting the tag information, the controller determines the tag information to be valid.

8. The portable device of claim 7, further comprising a timer which counts a time from the point when the RFID reader detects the tag information, wherein if the counted time exceeds the predetermined validation time, the controller controls the RFID reader to re-detect the tag information of the RFID tag according to the read command, and if the counted time does not exceed the predetermined validation time, the controller detects the tag information stored in the memory according to the read command.

9. The portable device of claim 8, wherein, if the counted time does not exceed the predetermined validation time, the controller determines the validation degree using the difference between the counted time and the predetermined validation time.

10. The portable device of claim 5, wherein, if the current position is within a predetermined validation distance from the point where the tag information is detected, the controller determines the tag information to be valid.

11. The portable device of claim 10, further comprising a distance measuring part which measures a moving distance from the point of detecting the tag information to a point of inputting the read command, wherein if the moving distance exceeds the predetermined validation distance, the controller controls the RFID reader to re-detect the tag information of the RFID tag according to the read command, and if the moving distance does not exceed the predetermined validation distance, the controller detects the tag information stored in the memory according to the read command.

12. The portable device of claim 11, wherein, if the moving distance does not exceed the validation distance, the controller determines the validation degree based on a difference between the moving distance and the validation distance.

13. The portable device of claim 3, further comprising:
a communication unit which performs wireless communication with a server corresponding to the tag information, and receives predetermined information; and
a display which displays data received from the communication part according to the control of the controller.

14. The portable device of claim 1, wherein the memory stores information about a time and a location of detecting the tag information, together with the tag information.

15. The portable device of claim 1, wherein the memory deletes the stored tag information if a predetermined time elapses since the storage of the tag information.

16. The portable device of claim 2, wherein, if the read command is input, the RFID reader detects tag information of all RFID tags within a predetermined reading distance for a predetermined time.

17. The portable device of claim 2, wherein, if the read command is input through the input during execution of a predetermined application program, the controller controls the RFID reader to selectively detect only the tag information of the RFID tag which corresponds to the application program.

18. A radio frequency identification (RFID) tag reading method of a portable device, the method comprising:
if a read command is input, determining whether previously detected and stored tag information is valid; and
if it is determined that the tag information is valid, providing the stored tag information,
wherein the tag information is determined to be valid when the read command is input within a predetermined validation time or the RFID tag is determined to be within a predetermined validation distance, and
a controller detects the tag information according to the read command by comparing a moving distance of the portable device with the predetermined validation distance, the moving distance being measured from a point of detecting the tag information to a point of inputting the read command.

19. The RFID tag reading method of claim 18, further comprising, if it is determined that the tag information is determined to be not valid, reading the RFID tag and detecting and providing the tag information of the RFID tag.

20. The RFID tag reading method of claim 19, further comprising, if the detected tag information is the same as the previously stored tag information, discarding the detected tag information, and if the detected tag information is not same as the previously stored tag information, storing the detected tag information.

21. The RFID tag reading method of claim 18, wherein the determining whether the previously detected and stored tag information is valid comprises determining whether the tag information is valid using an elapsed time from a time of detecting the tag information.

22. The RFID tag reading method of claim 21, wherein the determining whether the previously detected and stored tag information is valid comprises:
counting an elapsed time from the time of detecting the tag information;
comparing the counted time and a predetermined validation time; and
if the counted time does not exceed the validation time, determining the tag information to be valid, and if the counted time exceeds the validation time, determining the tag information to be invalid.

23. The RFID tag reading method of claim 22, further comprising, if the tag information is determined to be valid, determining a validation degree of the tag information using a difference between the counted time and the validation time.

24. The RFID tag reading method of claim 18, wherein the determining whether the previously detected and stored tag information is valid comprises determining whether the tag information is valid based a distance from a location of detecting the tag information to current location.

25. The RFID tag reading method of claim 24, wherein the determining whether the previously detected and stored tag information is valid comprises:
    measuring a moving distance from the location of detecting the tag information to a location of inputting the read command; and
    if the moving distance does not exceed a predetermined validation distance, determining the tag information to be valid, and if the moving distance exceeds the validation distance, determining the tag information to be invalid.

26. The RFID tag reading method of claim 25, further comprising, if the tag information is determined to be valid, determining a validation degree of the tag information using a difference between the moving distance and the validation distance.

27. The RFID tag reading method of claim 18, further comprising:
    wirelessly communicating with a server corresponding to the tag information, and receiving data; and
    displaying the received data.

28. The RFID tag reading method of claim 18, further comprising additionally storing information about a time and a location of detecting the tag information.

29. The RFID tag reading method of claim 18, if a predetermined time elapses since the storing of the tag information, deleting the stored tag information.

30. The RFID tag reading method of claim 19, wherein the detecting the tag information of the RFID tag comprises detecting tag information of all RFID tags within a predetermined reading distance.

31. The RFID tag reading method of claim 19, wherein if the read command is input during the execution of a predetermined application program, the detecting the tag information of the RFID tag selectively detects only the tag information of the RFID tag which corresponds to the application program.

32. The portable device of claim 1, wherein the predetermined validation distance is a moving distance between a previous reading point of the RFID reader and a current reading point of the RFID reader.

33. The RFID tag reading method of claim 18, wherein the predetermined validation distance is a moving distance between a previous reading point of the RFID reader and a current reading point of the RFID reader.

* * * * *